L. F. CHRESTENSON.
AXLE CONSTRUCTION.
APPLICATION FILED APR. 17, 1919.

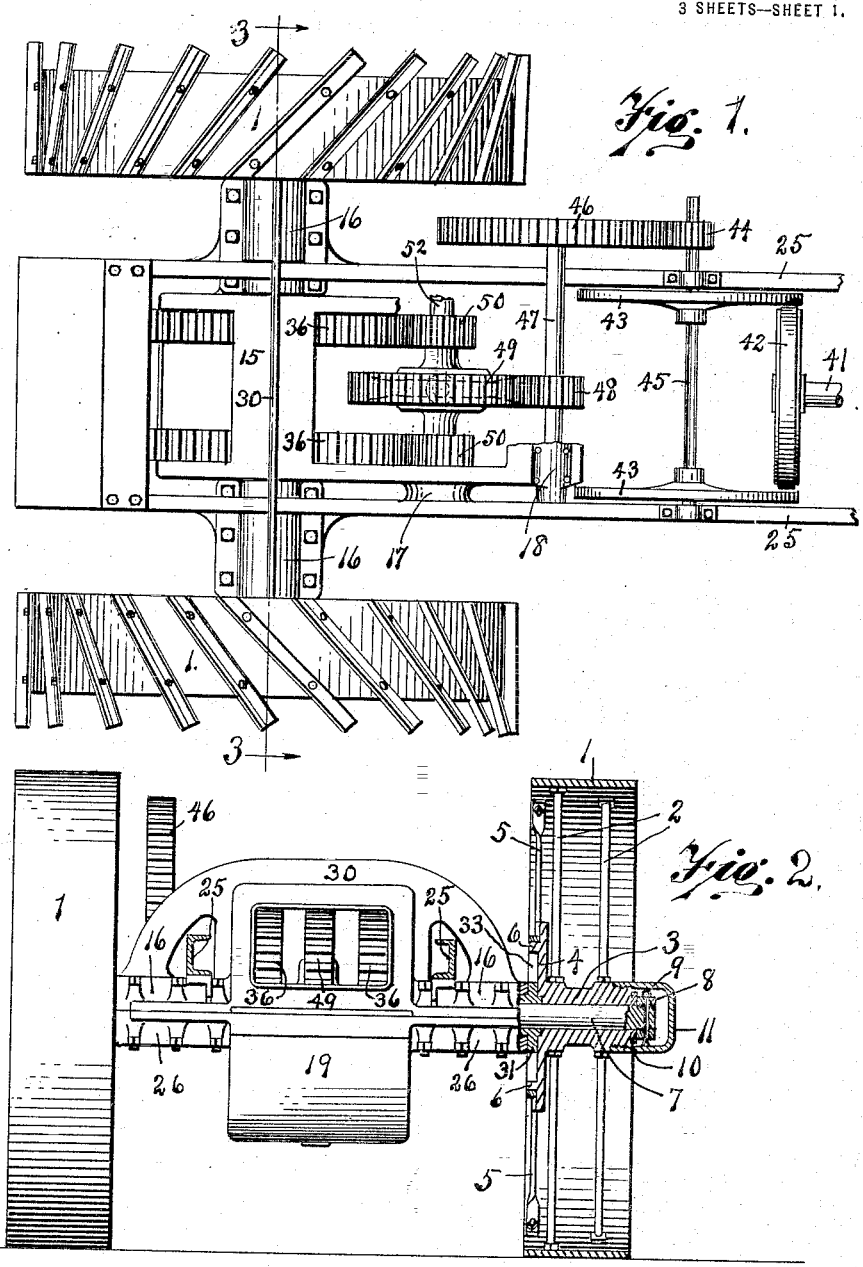

1,340,932.

Patented May 25, 1920.
3 SHEETS—SHEET 2.

Witness
G. F. Hauke.

Inventor
L. F. Chrestenson
By Pagelsen and Spencer
Attorneys

L. F. CHRESTENSON.
AXLE CONSTRUCTION.
APPLICATION FILED APR. 17, 1919.

1,340,932.

Patented May 25, 1920.
3 SHEETS—SHEET 3.

Witness
Inventor
L. F. Chrestenson
By Pagelsen and Spencer
Attorneys.

UNITED STATES PATENT OFFICE.

LOUIS F. CHRESTENSON, OF PORT HURON, MICHIGAN, ASSIGNOR TO PORT HURON ENGINE & THRESHER COMPANY, OF PORT HURON, MICHIGAN, A CORPORATION OF MICHIGAN.

AXLE CONSTRUCTION.

1,340,932.   Specification of Letters Patent.   Patented May 25, 1920.

Application filed April 17, 1919. Serial No. 290,646.

*To all whom it may concern:*

Be it known that I, LOUIS F. CHRESTENSON, a citizen of the United States, and residing at Port Huron, in the county of St. Clair and State of Michigan, have invented a new and Improved Axle Construction, of which the following is a specification.

This invention relates to the driving-axle mechanism of motor vehicles, particularly of heavy tractors, and its object is to provide an axle construction which will be of maximum strength, which can be easily assembled, and which can be built at moderate cost.

This invention consists of a frame at the rear end of any desired construction of chassis for motor vehicles, which frame has two long bearings in alinement with each other transversely to the line of the vehicle, a sleeve rotatably mounted in each bearing, an axle extending through both of the sleeves and journaled therein, a tractor wheel loose on each end of the axle outside of the sleeves, means connecting each tractor wheel to the adjacent outer end of a sleeve, gears connected to the inner ends of the sleeves, and a differential mechanism to drive the gears. It also consists in forming flanges or spiders integral with the ends of these sleeves and in connecting the driving gears and tractor wheels to these flanges. It also consists in forming the frame with a strong arched rib extending between bearings so as to transversely stiffen the frame. It further consists in the details of construction illustrated in he accompanying drawings and particularly pointed out in the claims.

Figure 3:
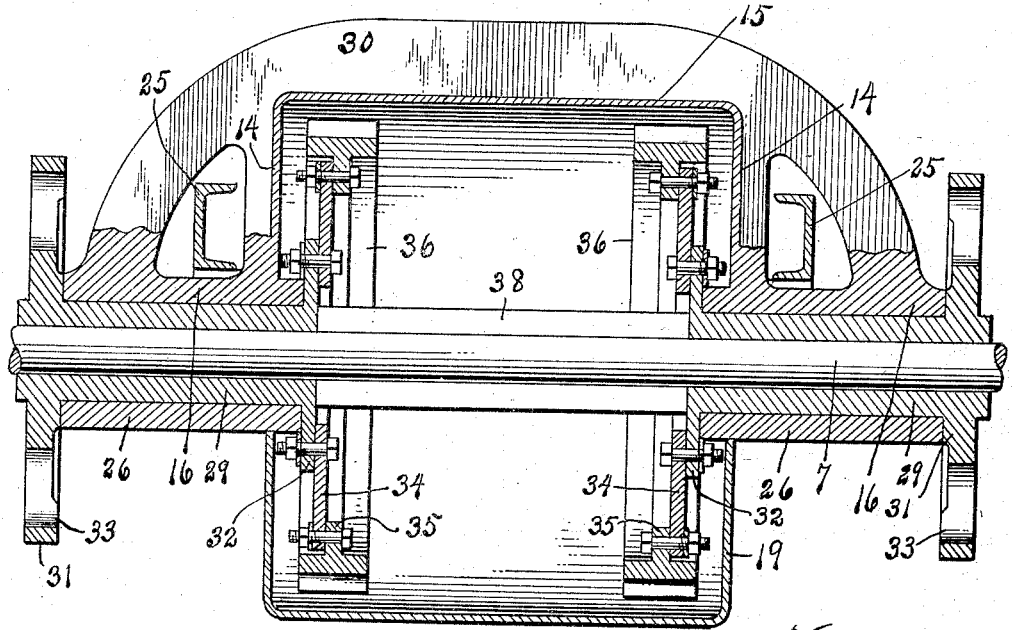
Figure 4:
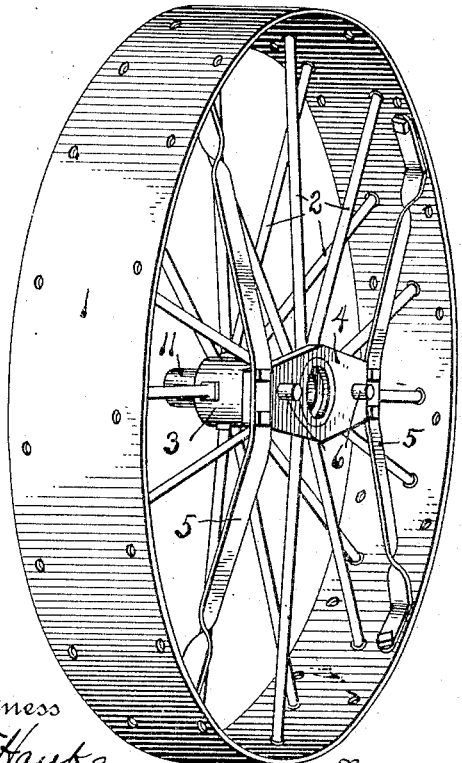
Figure 5:
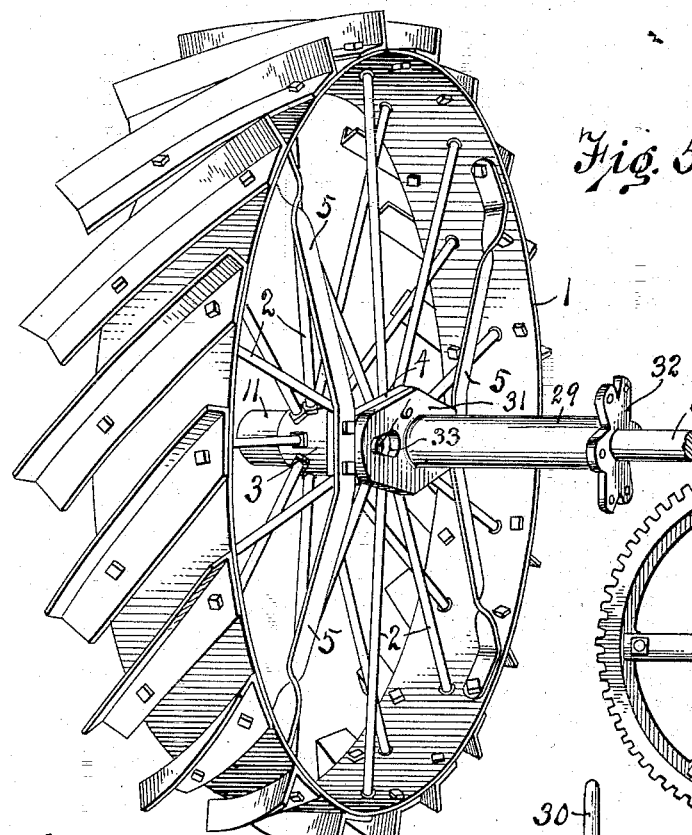
Figure 6:
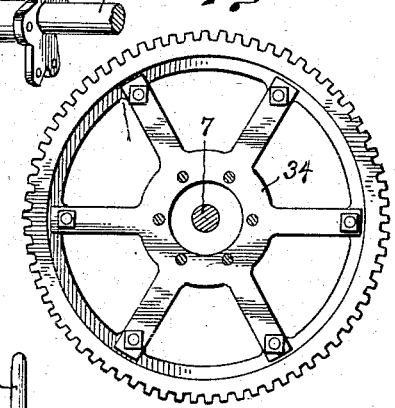
Figure 7:
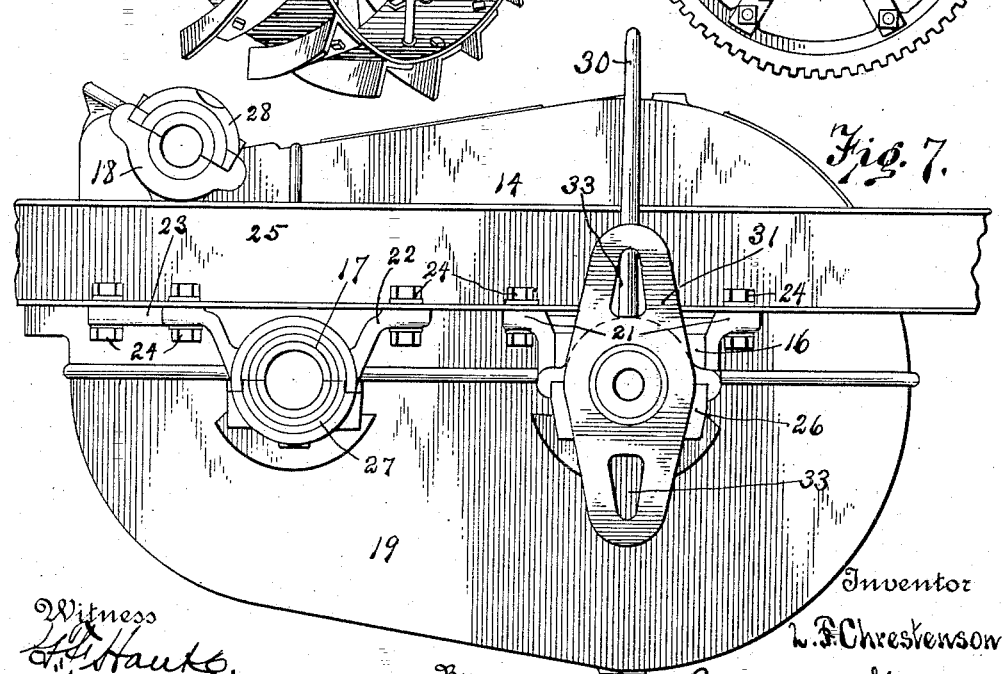

In the drawings, Figure 1 is a plan and Fig. 2 is a rear elevation of the rear end of a tractor embodying this improved driving mechanism. Fig. 3 is a section on a larger scale of the frame on the line 3—3 of Fig. 1. Fig. 4 is a perspective of a tractor wheel. Fig. 5 is a similar perspective of this wheel with a driving sleeve and part of the axle. Fig. 6 is an exterior elevation of a driving gear and its spider. Fig. 7 is a side elevation of the frame.

Similar reference characters refer to like parts throughout the several views.

The tractor wheels are preferably formed with separate rims 1, spokes 2 and hubs 3 which have flanges 4 at their inner ends. Driving braces 5 extend from the ends of these flanges to the rims and are securely bolted into position and pins 6 extend inwardly from these flanges. An axle 7 extends across through both of these wheels and the frame which supports the driving mechanism and is loose therein, its function being merely to support the wheels and to prevent them from moving outwardly. For this purpose a collar 8 may be screwed into each end of the axle and a split pin 9 may be employed to prevent the collar from turning, as shown in Fig. 2. A washer 10 may be placed between the wheel hub and collar 8 if desired and a hub cap 11 may be employed to keep out dust and dirt.

The frame consists of sides 14, top 15, and bearings 16, 17 and 18 and it may be provided with an oil pan 19 as shown in Figs. 3 and 7. Adjacent the bearings 16 and 17 are flanges 21, 22 and 23 which receive bolts 24 that connect this frame to the side bars 25 of the chassis. The bearings 16 and 17 have bottom caps 26 and 27 respectively while the bearings 18 have top caps 28. A strong arch rib 30 extends across from one bearing 16 to the other, being integral with the top 15 of the frame. This rib has openings to receive the side-bars 25 of the chassis.

The bearings 16 are long, as shown in Figs. 1, 2 and 3, and receive the sleeves 29 which have flanges 31 and 32 at their ends to prevent endwise movement. The flanges 31 are provided with slots 33 to receive the pins 6 on the flanges 4 on the hubs of the tractor wheels. The flanges 32 are bolted to the spiders 34 and these are in turn bolted to the lugs 35 on the gear rings 36. In fact, the sleeves 29 constitute the hubs of the main driving gears. These gears are within the frame and may dip down into the lubricant in the oil pan 19. If desired, a sleeve 38 may be mounted on the axle between the gears or may be made integral with either of the spiders 34.

These gears may be driven in any desired manner. In Fig. 1 an engine shaft 41 is shown conventionally, provided with a friction wheel 42 adapted to drive either one of the disks 42 or 43 and the pinion 44 on the shaft 45. This pinion meshes with the gear 46 on the shaft 47 which also carries a pinion 48 that meshes with a driving gear 49 of a differential gearing mechanism which is not shown but whose driven pinions 50 mesh with the main gears 36. A shaft 52 runs in the bearings 17 to support the differential gearing while the shaft 47 runs in the bearings 18.

It will be seen that after removing the hub caps, pins 9 and collars 8, the axle 7 can be withdrawn and the tractor wheels removed without disarranging any of the driving gears. The differential can be removed as a unit after the bearing caps 27 are removed. The sleeves 29 and the gear rings 36 attached thereto can be taken out after the oil pan 19, bearing caps 26 and tractor wheels have been removed without disturbing the differential, and the entire gear frame, differential and rear axle may be removed from the chassis after taking out the bolts 24 which secure the flanges 21, 22 and 23 to the side bars 25 of the chassis. See Fig. 7. The rib 30 is made of sufficient strength to receive the upward thrust of the tractor wheels without yielding, thus permitting the sleeves and the axle to be made with minimum weight.

The details and proportions of the various parts of this mechanism may all be changed by those skilled in the art without departing from the spirit of my invention as set forth in the following claims.

I claim:—

1. In an axle construction, the combination of a frame having a pair of alined bearings, a transversely arched rib extending across between the bearings, frame side bars connected to said bearings, a second pair of bearings connected to the side bars, and casing members connected to the bearings, one of said casing members connecting to said arched rib, and an axle extending through the bearings connected by the rib.

2. In an axle construction, a casing divided substantially horizontally, pairs of bearings connected to the casing, and an arched rib extending across between one pair of bearings and formed integral with the adjacent part of the casing, and an axle extending through the bearings connected by said arched rib.

3. In an axle construction, the combination of a frame having a pair of alined bearings, a transverse arched rib extending across between the bearings, a sleeve mounted in each bearing and having a flange at each end to prevent endwise movement, a tractor wheel connected to the flange at the outer end of each bearing, and driving means connected to the inner end of each sleeve.

LOUIS F. CHRESTENSON.